United States Patent [19]

Mori et al.

[11] Patent Number: 5,356,695
[45] Date of Patent: Oct. 18, 1994

[54] STRUCTURE OF PANEL

[75] Inventors: Takeo Mori, Susono; Eiichi Hamada, Toyota; Tomohisa Kato, Susono, all of Japan

[73] Assignees: Toyota Jidosha Kabushiki Kaisha, Toyota; Kabushiki Kaisha Toyota System Research, Nagoya, both of Japan

[21] Appl. No.: 1,761

[22] Filed: Jan. 7, 1993

[30] Foreign Application Priority Data

Jan. 10, 1992 [JP] Japan .................... 4-020659
Nov. 13, 1992 [JP] Japan .................... 4-327506

[51] Int. Cl.$^5$ .................... B32B 1/00; B60J 7/00
[52] U.S. Cl. .................... 428/174; 428/192; 428/212; 296/210; 296/214
[58] Field of Search .................... 428/156, 172, 174, 45, 428/99, 192, 212; 296/210, 214

[56] References Cited

U.S. PATENT DOCUMENTS

| 2,946,623 | 7/1960 | Barenyi et al. | 296/137 |
| 3,008,760 | 11/1961 | Barenyi et al. | 296/137 |
| 3,063,200 | 11/1962 | Linville | 50/52 |
| 4,037,614 | 7/1977 | Hines et al. | 135/5 A |
| 4,886,696 | 12/1989 | Bainbridge | 428/182 |

FOREIGN PATENT DOCUMENTS 0051093 5/1982 European Pat. Off.
3908433 9/1989 Fed. Rep. of Germany.
61-177984 11/1986 Japan.

*Primary Examiner*—Donald J. Loney
*Attorney, Agent, or Firm*—Cushman, Darby & Cushman

[57] ABSTRACT

A structure of a panel includes a peripheral portion and an intermediate portion integrally provided with the peripheral portion. At least the intermediate portion includes a curved surface having a substantially constant sum of the maximum curvature and the minimum curvature at all the points on a surface of the intermediate portion. Further, the peripheral portion is formed as the same curved surface as the curved surface of the intermediate portion, or a curved surface having a curvature different from the curvature of the curved surface of the intermediate portion so as to enhance the panel stiffness of the peripheral portion.

6 Claims, 5 Drawing Sheets

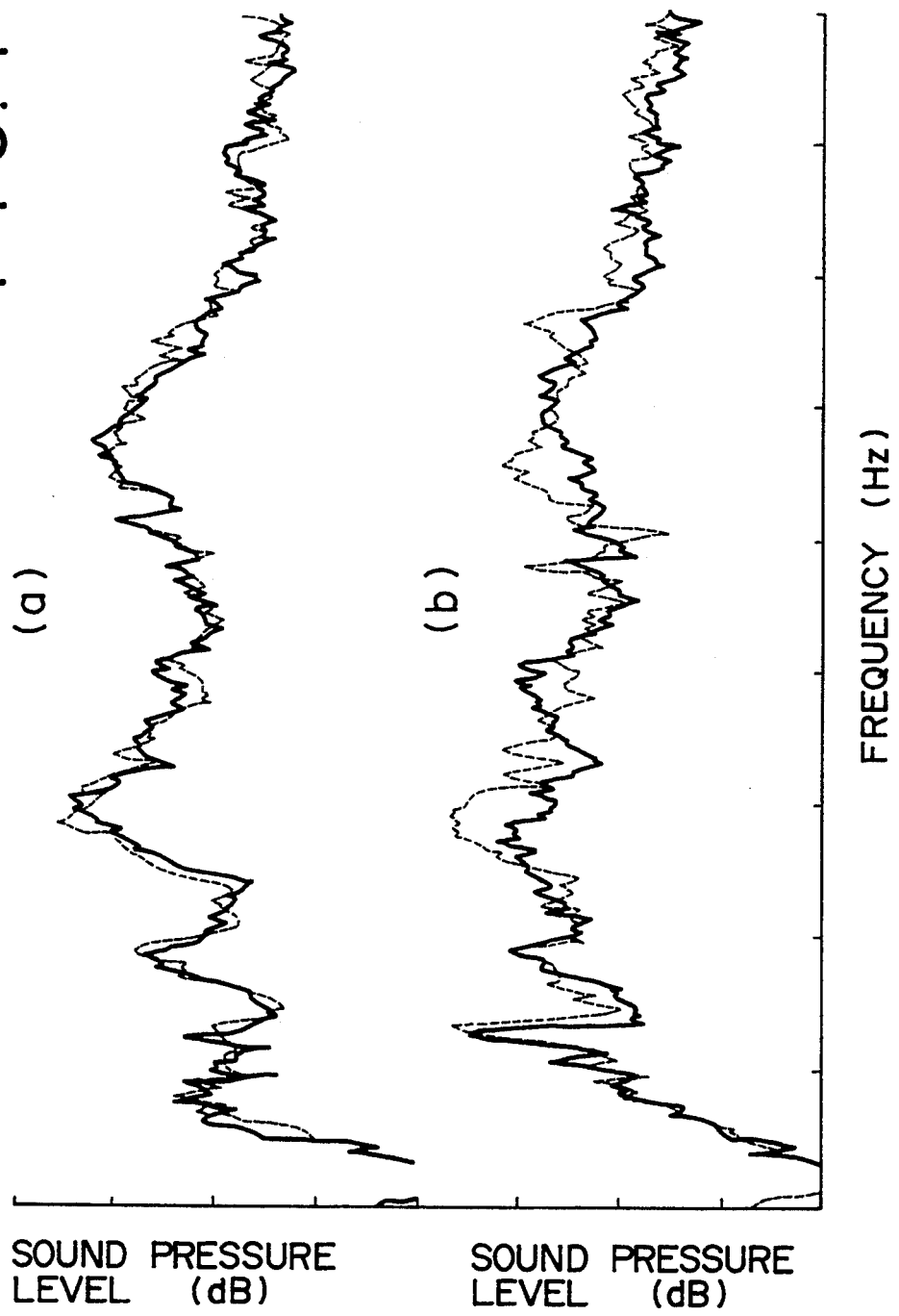

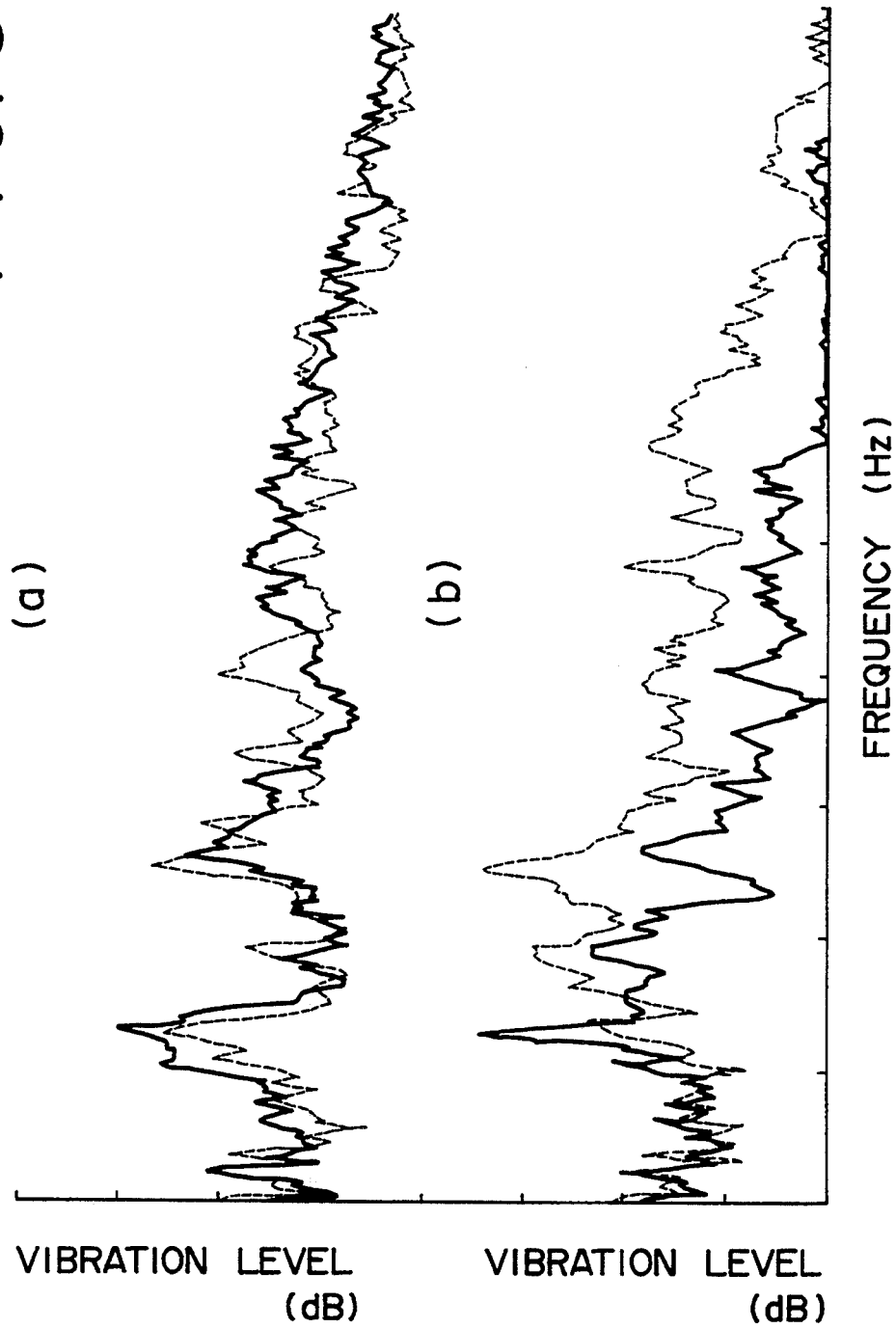

STRUCTURE OF PANEL

BACKGROUND OF THE INVENTION

1. Field of the Invention

This invention relates to a structure of a panel. As used herein, the term "panel" means a flat or plate material having a smoothly curved surface throughout the material. For example, the panel may include an outside plate of a vehicle body or body such as a roof panel, a hood panel, a door outer panel, a quarter panel or a fender panel, and an inside plate of the body such as a floor pan, a dash panel, an upper back panel or a lower back panel. Further, the panel may include a panel of an instrument such as a fuel tank, and a non-metal panel such as a front windshield glass, a back window glass or a door glass of the vehicle. Moreover, the panel may include a roof and a window glass of a railway vehicle, and a window glass of a building.

2. Description of the Prior Art

For example, in a roof of a vehicle having a panel, the panel 10 is generally formed as including a curved surface provided with an intermediate portion 11 and a peripheral portion 12, the intermediate portion 11 having a curvature less than the curvature of the peripheral portion 12 as shown by the dotted line of FIG. 1. This is mainly based on demand for design.

As a special panel, there is provided a panel which is made of plastic so as to have a thickened intermediate portion and a thinned peripheral portion, a thickness of the panel gradually becoming thinner from the intermediate portion toward the peripheral portion (See Japanese Utility Model Public Disclosure (KOKAI) No. 61-177984).

In general, the thickness of the panel is determined depending upon the degree of deflection of the panel, i.e., panel stiffness at a time when applying, a predetermined load. However, in conventional panels, the thickness of the panel is determined on the basis of the intermediate portion having the smallest panel stiffness since the intermediate portion and the peripheral portion have each different panel stiffness due to the different curvature on the panel surface. As a result, the peripheral portion is provided with an excess thickness so that the panel becomes heavy excessively.

The panel stiffness of the intermediate portion may be increased by using the panel having the thickened intermediate portion and the thinned peripheral portion, the thickness thereof becoming thinner from the intermediate portion toward the peripheral portion as disclosed in the above-mentioned Japanese Utility Model Public Disclosure. However, the weight of the panel is increased correspondingly to the increased thickness of the intermediate portion. Further, when the panel is made of steel plate, glass or the like which is difficult to use injection molding or extrusion molding, the manufacture of the panel is complicated.

SUMMARY OF THE INVENTION

It is an object of the present invention to provide a structure of a panel, which can provide substantially uniform panel stiffness without partially varying a thickness of the panel.

It is another object of the present invention to provide a structure of a panel, which enhances panel stiffness of a peripheral portion, thereby enabling reduction of a weight of the panel.

In a structure of a panel according to the present invention, the panel includes a curved surface having a substantially constant sum of the maximum curvature and the minimum curvature at all the points on the curved surface. The panel is formed by two curved surfaces with an appropriate thickness therebetween.

Alternatively, according to the present invention, in a structure of a panel having a peripheral portion and an intermediate portion integrally provided with the peripheral portion, the intermediate portion includes a curved surface having a substantially constant sum of the maximum curvature and the minimum curvature at all the points on the curved surface of the intermediate portion, and the peripheral portion includes a curved surface having a curvature different from the curvature of the curved surface of the intermediate portion so as to enhance the panel stiffness of the peripheral portion.

The inventors made certain that the amount of deflection at one point on the panel has a characteristic to decrease in proportion to the sum of the maximum curvature and the minimum curvature at that point. Based upon the certain fact, it is possible to determine a value of the sum of the maximum curvature and the minimum curvature uniquely in correspondence to an allowable deflection amount.

Thus, at least the intermediate portion of the panel is formed as including a curved surface having a substantially constant sum of the maximum curvature and the minimum curvature at all the points on at least the intermediate portion of the panel. Accordingly, it is possible to provide the substantially constant amount of deflection, i.e., the substantially constant panel stiffness at all the points on the intermediate portion. Concerning the peripheral portion of the panel, the peripheral portion is formed as including a curved surface having a substantially constant sum of the maximum curvature and the minimum curvature at all the points on the surface of the peripheral portion, the substantially constant sum being equal to the sum of the maximum curvature and the minimum curvature on the intermediate portion so as to have the same amount of deflection as the amount of the intermediate portion. Alternatively, the peripheral portion is formed as including a curved surface having a curvature different from the curvature of the curved surface of the intermediate portion so as to enhance the panel stiffness of the peripheral portion.

According to one aspect of the present invention, it is possible to provide a substantially constant panel stiffness at all the points of the panel, and reduce the weight of the panel without partially varying the thickness of the panel. According to another aspect of the present invention, it is possible to provide a substantially constant panel stiffness of the intermediate portion of the panel, and further reduce the weight of the panel because of the enhanced panel stiffness of the peripheral portion.

BRIEF DESCRIPTION OF THE DRAWINGS

The foregoing and other objects and features of the invention will become apparent from the following description of preferred embodiments of the invention with reference to the accompanying drawings, in which:

FIG. 7 is a frequency characteristic graph qualitatively showing sound pressure levels before and after changing a roof panel, wherein reference mark a denotes forward sound pressure, and reference mark b denotes backward sound pressure; and FIG. 8 is a frequency characteristic graph qualitatively showing vibration levels before and after changing the roof panel, wherein reference mark a denotes a forward portion of the panel, and reference mark b denotes an intermediate portion of the panel.

DESCRIPTION OF THE PREFERRED EMBODIMENTS

The present invention relates to a structure Of a panel 20. At least an intermediate portion 21 of the panel 20 is formed as including a curved surface having a substantially constant sum of the maximum curvature $\rho max$ and the minimum curvature $\rho min$ at all the points on a surface of the intermediate portion 21.

As used herein, the term "intermediate portion" means a portion having relatively reduced restriction by supporting means as will be described hereinafter. In case the panel 20 is a roof of a vehicle, for example, when the panel 20 is mounted on a vehicle body, a peripheral portion of the panel 20 is supported and restricted by a rigid member such as a roof side rail. Alternatively, in case the panel 20 is a windshield glass, the peripheral portion of the panel 20 is fitted into, supported by and restricted by a mounting groove. On the other hand, a portion other that the peripheral portion, i.e., the intermediate portion has relatively reduced restriction.

Figure 1:
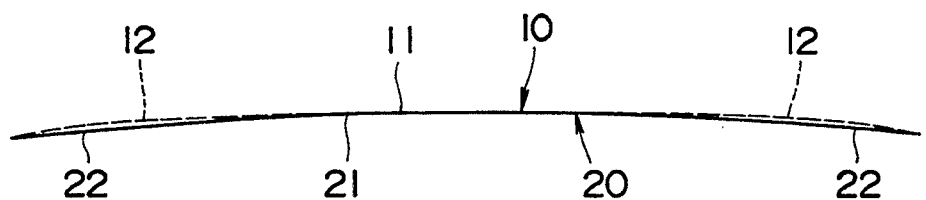
FIG. 1 is a schematic view showing curvatures in a section of a panel in a lateral direction of a vehicle.
Figure 2:
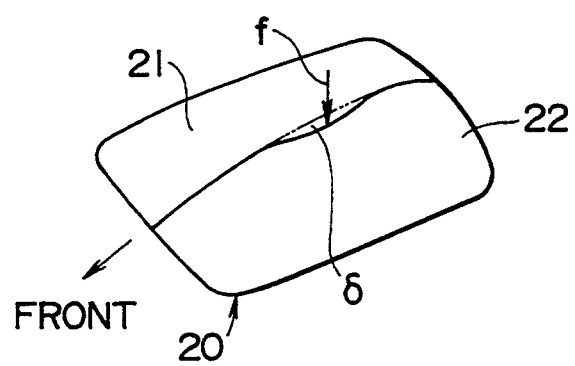
FIG. 2 is a perspective view of the panel which is deflected due to load.

In an embodiment as shown in FIGS. 1 and 2, the panel 20 includes the curved surface having the substantially constant sum of the maximum curvature $\rho max$ and the minimum curvature $\rho min$ at all the points on the surface of the intermediate portion 21 and the peripheral portion 22.

When the intermediate portion 21 of the panel 20 includes the curved surface having the substantially constant sum of the maximum curvature and the minimum curvature at all the points on the surface of the intermediate portion 21, it is possible to determine the curved surface of the peripheral portion 22 of the panel 20 so as to enhance the panel stiffness of the peripheral portion 22. In order to enhance the panel stiffness of the peripheral portion 22, the peripheral portion 22 may be formed as including a curved surface having a substantially constant sum of the maximum curvature and the minimum curvature at all the points on a surface of the peripheral portion 22, the substantially constant sum being different from the sum of the maximum curvature and the minimum curvature on the intermediate portion 21. Alternatively, in order to enhance the panel stiffness of the peripheral portion 22, the curved surface of the peripheral portion 22 may be formed according to another equation having no relation to the present invention.

As shown in FIG. 2, deflection $\delta$ occurs when load f is applied to one point of the panel 20. In this case, as the deflection $\delta$ is larger under a certain load, panel stiffness at the point is further decreased.

Figure 3:
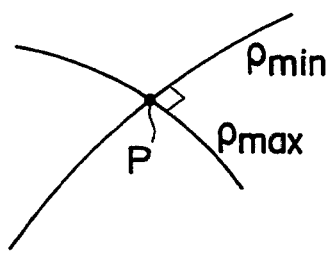
FIG. 3 is a schematic view showing the maximum curvature and the minimum curvature existing at one point on the panel.

When the panel 20 is formed as including a curved surface, there are the maximum curvature $\rho max$ and the minimum curvature $\rho min$ intersecting at right angle at one point P on the curved surface as shown in FIG. 3. There is a case where both the curvatures may be identical. In this case, one of the curvatures is defined as the maximum curvature, and the other is defined as the minimum curvature.

Figure 4:
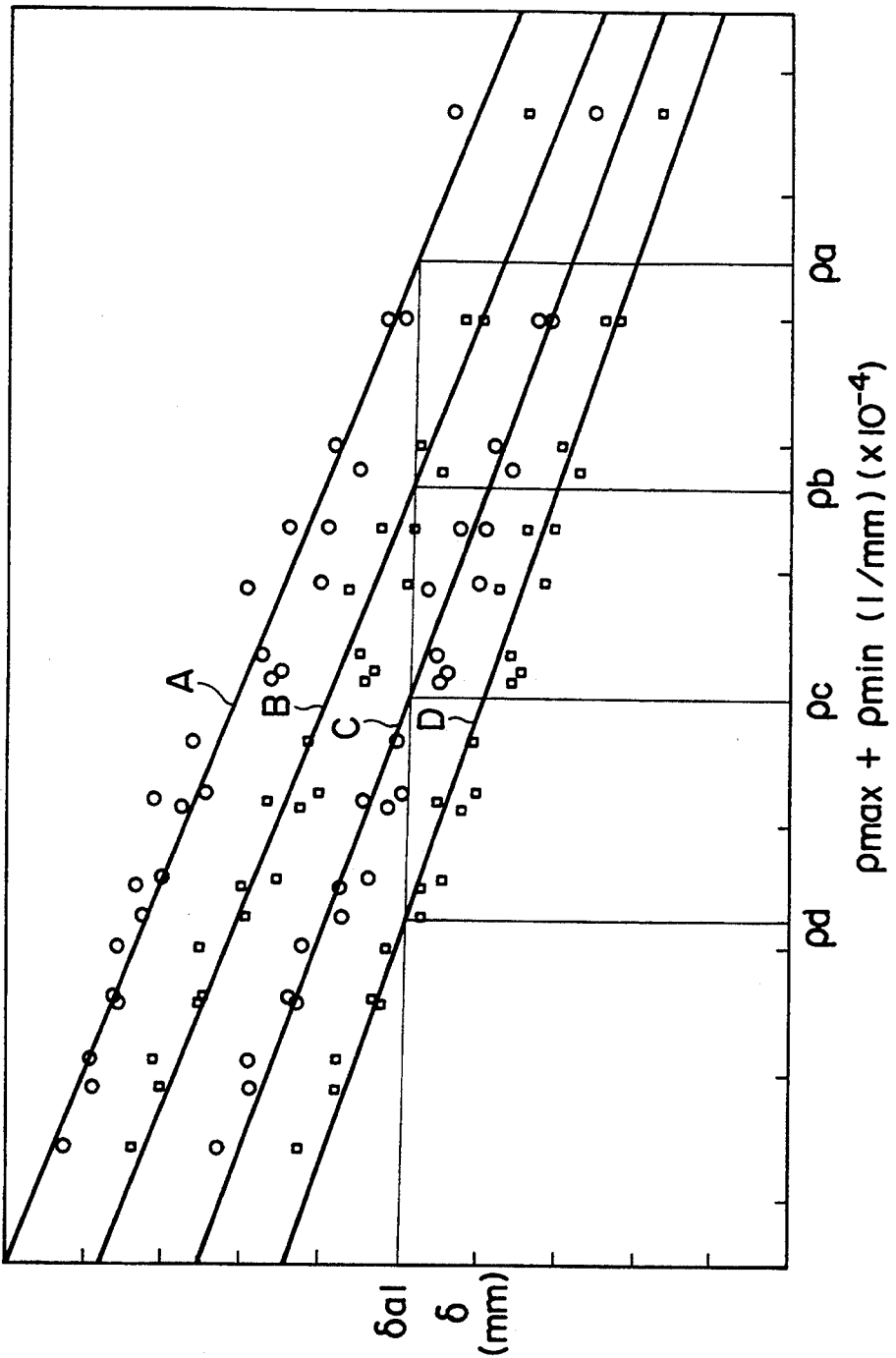
FIG. 4 is a characteristic graph qualitatively showing the deflection which is decreased in proportion to the sum of the maximum curvature and the minimum curvature.

It is made certain that the deflection $\delta$ at one point P of a panel presents characteristics as shown by reference marks A to D of FIG. 4 when the sum of the maximum curvature $\rho max$ and the minimum Curvature $\rho min$ at the point P is variously changed in cask the load f is kept constant at 5 kgf. The reference marks A to D are defined depending upon different thickness of the panel, that is, the reference marks A to D are varied from the smallest thickness A to the largest thickness D in this order.

Referring now to FIG. 4, it can be seen that the amount of deflection $\delta$ at one point is decreased in proportion to the sum of the maximum curvature $\rho max$ and the minimum curvature $\rho min$ at that point. In the present invention, the optimal thickness is selected on the basis of the certain fact.

Sums $\rho a$ to $\rho d$ of the maximum curvature $\rho max$ and the minimum curvature $\rho min$ can be uniquely determined every each thickness when the allowable deflection $\delta a1$ of the panel is given. The sum of the maximum curvature $\rho max$ and the minimum curvature $\rho min$ is a factor which is restricted for design of the panel. Therefore, a preferable value for the design is first determined, and the thickness is then selected on the basis of the preferable value and the allowable deflection.

After the thickness is determined, the panel 20 is formed as including the curved surface wherein the sum of the maximum curvature $\rho max$ and the minimum curvature $\rho min$ at all the points on the surface is substantially equal to the above-mentioned value. In this case, inequalities $\rho max > 0$ and $\rho min > 0$ are preferably satisfied in order to enhance the panel stiffness of the panel 20. As shown in FIG. 1, the curved surface of the panel 20 determined as set forth above has substantially no difference between the curvature of the intermediate portion 21 and the curvature of the peripheral portion 22.

When the curved surface of the panel 20 is to be determined, it is best to determine a curved surface such that the sum of the maximum curvature $\rho max$ and the minimum curvature $\rho min$ is equal to the above-mentioned value at all the points on the surface instead of the determination, lines may be described in a grid manner or in a checkerboard pattern on the panel 20 to determine the curved surface such that the sum of the maximum curvature $\rho max$ and the minimum curvature $\rho min$ at intersections of the lines is equal to the above-mentioned value. Further, a smooth curved surface may be provided to interconnect the adjacent intersections. As used in the present specification, it must be noted that the latter aspect should be included in the expression that the sum of the maximum curvature and the minimum curvature comes to a substantially constant value at all the points on a surface.

Figure 5:
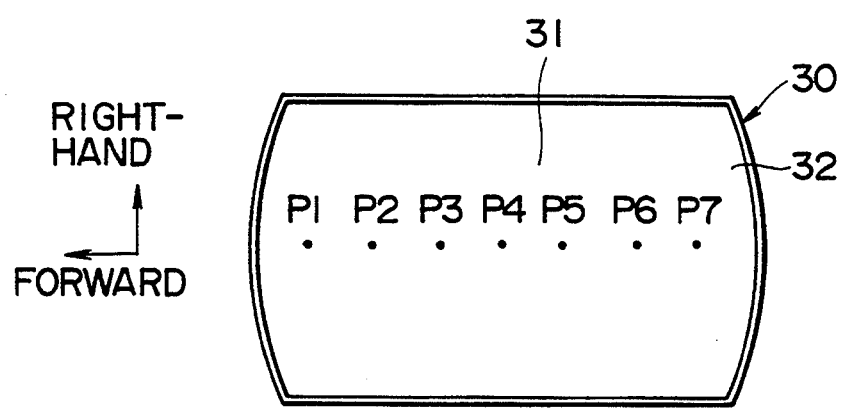
FIG. 5 is a plan view showing measuring points on the panel.

When the panel is a roof 30 of the vehicle, seven measuring positions P1 to P7 are uniformly disposed along an intermediate line extending in the forward and backward direction of the roof 30 as shown in FIG. 5. Thus, the measuring positions P1 and P7 are disposed on a peripheral portion 32 which is restricted by the supporting means (not shown), and the measuring positions P2 to P6 are disposed on an intermediate portion 31.

Figure 6:
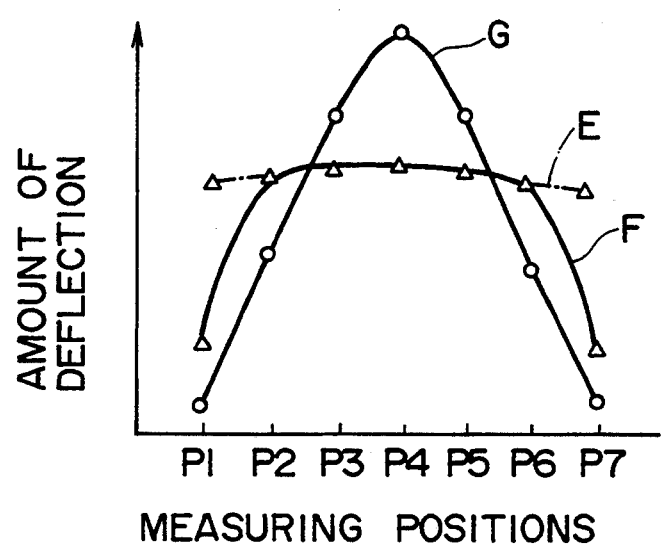
FIG. 6 is a characteristic graph qualitatively showing the amount of deflection at the measuring points shown in FIG. 5, including tendencies E, F according to the present invention and conventional tendency G.

When the panel 30 is formed as including a curved surface having a substantially constant sum of the maximum curvature and the minimum curvature on the overall surface of the panel, the amount of deflection at each measuring position is substantially constant to present a tendency E as shown in FIG. 6. In this state, the amounts of deflection at the measuring points P1 and P7 included in the peripheral portion 32, however, become excessively increased. Then, if the panel 30 is formed as including a curved surface having a substantially constant sum of the maximum curvature and the minimum curvature on the overall surface at the measuring positions P2 to P6 included in the intermediate portion 31, and if the amount of deflection on the peripheral portion 32 is reduced, a tendency F is observed. It is thereby possible to enhance the panel stiffness of the peripheral portion 32. On the other hand, a tendency G is observed in the conventional structure wherein the thickness of the panel is determined on the basis of the amount of deflection of the intermediate portion of the panel. That is, the amount of deflection at the median measuring position P4 is excessively large.

FIG. 7 illustrates sound pressure level within a vehicle cabin before and after changing the roof panel in experiment of the vehicle body. On the other hand, FIG. 8 illustrates vibration level of the roof panel before and after changing the roof panel. In the drawings, the dotted lines represent the conventional structure, and the solid lines represent a structure according to the present invention wherein the sum of the maximum curvature and the minimum curvature comes to a substantially constant value on the overall surface of the panel. Reference mark a of FIG. 7 denotes sound pressure at a front seat in the vehicle cabin, and reference mark b of FIG. 7 denotes sound pressure at a back seat. Further, reference mark a of FIG. 8 denotes vibration of a forward portion of the roof panel, and reference mark b of FIG. 8 denotes vibration of a backward portion of the roof panel.

Meanwhile, a soap membrane (i.e., a soap bubble) can provide a theoretical basis for the present invention. The soap membrane can be considered to have the most rational configuration to a constant inner pressure load, which is naturally selected. Therefore, a panel stiffness is to be enhanced by providing the structure of the panel which is similar to a structure supported by membrane force.

A differential equation of the soap membrane can be expressed as follows:

$$\left\{1 + \left(\frac{\partial f}{\partial x}\right)^2\right\}\frac{\partial^2 f}{\partial x^2} - 2\frac{\partial f}{\partial x}\cdot\frac{\partial f}{\partial y}\cdot\frac{\partial^2 f}{\partial x \partial y} +$$ (Equation 1)

-continued $$\left\{1 + \left(\frac{\partial f}{\partial y}\right)^2\right\}\frac{\partial^2 f}{\partial y^2} = 0$$

The equation represents a curved surface having the smallest area when a given volume is trapped within the curved surface, one of which is the soap membrane. It is assumed that isothermal orthogonality holds since the above equation can not be solved as it is. The term "isothermal orthogonality" means division of the curved surface into square meshes for modeling. The modeling results in reduction of the expression to the following Laplace equation:

$$\frac{\partial^2 f}{\partial x^2} + \frac{\partial^2 f}{\partial y^2} = 0$$ (Equation 2)

Depending upon the certain fact, the sum of the maximum curvature $\rho$max and the minimum curvature $\rho$min becomes a constant value for the deflection $\delta$ having a constant value. As a result, the following expression is established;

$$\sigma\text{max} + \sigma\text{min} =$$ (Equation 3)

$$\frac{\frac{\partial^2 f}{\partial x^2}}{\left\{1 + \left(\frac{\partial f}{\partial x}\right)^2\right\}^{\frac{3}{2}}} + \frac{\frac{\partial^2 f}{\partial y^2}}{\left\{1 + \left(\frac{\partial f}{\partial y}\right)^2\right\}^{\frac{3}{2}}} = C$$

If it is assumed that the panel is formed as including a curved surface which is enough to approximate to a flat, $$\left(\frac{\partial f}{\partial x}\right)^2 = 0, \left(\frac{\partial f}{\partial y}\right)^2 = 0$$ (Equation 4)

As a result, the Equation 3 can be reduced as follows:

$$\frac{\partial^2 f}{\partial x^2} + \frac{\partial^2 f}{\partial y^2} = C$$ (Equation 5)

The Equation 5 is a form which is extended from the Equation 2. From this result, it can be considered that the configuration of the soap membrane is significant for the panel stiffness.

What is claimed is:

1. A panel structure comprising:
   a peripheral portion; and
   an intermediate portion integrally provided with said peripheral portion;
   wherein at least said intermediate portion of said panel includes a curved surface having a substantially constant sum of the maximum curvature and the minimum curvature at every point on a surface of said intermediate portion, said curved surface extending continuously with a surface of said peripheral portion so as to be smooth over the panel, wherein said panel has a substantially uniform thickness.

2. A structure of a panel according to claim 1, wherein said peripheral portion of said panel includes a curved surface having a substantially constant sum of the maximum curvature and the minimum curvature at all the points on a surface of said peripheral portion, said sum being equal to said sum of the maximum curvature and the minimum curvature in said intermediate portion.

3. A structure of a panel according to claim 1, wherein said peripheral portion of said panel includes a curved surface having a curvature different from said curvature of the curved surface of said intermediate portion so as to enhance the panel stiffness of said peripheral portion.

4. A structure of a panel according to claim 3, wherein said peripheral portion of said panel includes a curved surface having a substantially constant sum of the maximum curvature and the minimum curvature at all the points on a surface of said peripheral portion, said sum being different from said sum of the maximum curvature and the minimum curvature in said intermediate portion.

5. A structure of a panel according to claim 3, wherein said peripheral portion of said panel includes a curved surface which is formed by an expression having no relation to said sum of the maximum curvature and the minimum curvature at all the points on the surface of said peripheral portion.

6. A structure of a panel according to claim 3, wherein said peripheral portion of said panel is restricted by supporting means.

* * * * *